United States Patent
Nelson

[15] 3,651,796
[45] Mar. 28, 1972

[54] GRILL
[72] Inventor: Walter A. Nelson, Salt Lake City, Utah
[73] Assignee: Rite Way, Inc., Salt Lake City, Utah
[22] Filed: May 11, 1970
[21] Appl. No.: 36,346

[52] U.S. Cl. ................................126/215, 99/450, 126/38, 248/206 A
[51] Int. Cl. .........................................................F24c 15/10
[58] Field of Search....................126/211, 215, 24, 25 A, 38, 126/304 A; 99/339, 447, 449, 450; 248/206 A

[56] References Cited

UNITED STATES PATENTS

| | | | |
|---|---|---|---|
| 2,977,082 | 3/1961 | Harris | 248/206 A |
| 3,013,550 | 12/1961 | Murchie | 126/25 AA |
| 3,330,204 | 7/1967 | Little | 99/450 X |
| 3,400,707 | 9/1968 | Owens | 126/211 |
| 3,423,708 | 1/1969 | Christian | 126/24 X |

FOREIGN PATENTS OR APPLICATIONS

| | | | |
|---|---|---|---|
| 13,545 | 1914 | Great Britain | 99/449 |
| 219,882 | 2/1959 | Australia | 126/25 A |

*Primary Examiner*—Charles J. Myhre
*Attorney*—M. Ralph Shaffer

[57] ABSTRACT

A cooking grill having independently extensible leg means such that the grill may be leveled even though the supporting surface is non-horizontal or even undulating. Bottoms of the leg supports for the grill are provided with or attached to magnetic means so that the grill may be supported in a stationary manner while the legs are being adjusted for height or the grill used. Clip means are provided with the grill for accommodating mounting to conventional camper-type stoves, for example. The magnetic means of the grill prevents the same from slipping sideways over the magnetically permeable surface to which the same is attached and upon which it rests.

5 Claims, 6 Drawing Figures

PATENTED MAR 28 1972 3,651,796

INVENTOR.
Walter A. Nelson
BY
M. Ralph Shaffer
His Attorney

GRILL

The present invention relates to cooking grills and, more particularly, to a new and improved cooking grill which can be leveled and used in a wide variety of context. These context include trailers, campers, or simply cooking-out over rocks or dirt.

In the past a problem has been presented when a level cooking surface is difficult to obtained in outdoor areas, particularly for campers, trailers and picnickers who, of necessity, must sometimes camp on undulating or sloping terrain. It is desirous of course that stove in campers and trailers be permanently secured; however, when a trailer or camper is parked on a slope, this means that the cooking surface of its stove is sloping also.

What the inventor has provided, therefore, is a new and improved grill member having legs which are independently adjustable, that is, extensible, so that a horizontal cooking surface can be obtained by varying the extensions of various ones of the legs. This accommodates grill for cooking not only in campers and trailers but also over rock, dirt, outdoor camping stove equipment, and so forth.

In the invention magnetic means are used at the bottom of the legs for preventing the grill from inadvertently sliding away or creeping during cooking or when manipulation of the legs is made to achieve proper leg height.

Specifically, in one form of the invention the legs are provided with support elements such as washers that are rotatably mounted to the respective legs. Magnetic means such as magnetic-tape washers are secured to the legs, or to magnetic surfaces intended to support the grill, so that grill anchoring remains fixed even though one or more legs may be adjusted, for example. In this way sliding and "creep" of the grill during use is avoided.

Accordingly, a principal object of the present invention is to provide a new and improved grill which can be leveled despite various conditions of supporting surface therefor.

A further object of the invention is to provide a grill having independently adjustable legs provided with magnetic means, this such that rotatable adjustment of the legs will not disturb the magnetic mounting of the grill to a supporting surface or surfaces.

An additional object is to provide for a grill, independently adjustable legs wherein the magnetic ends thereof are rotatably mounted to the legs; with such feature the legs may be rotatably adjusted without disturbing the magnetic engagement contact of the leg magnets with the supporting surface or surfaces.

An additional object is to provide a new and improved grill construction wherein suitable means are supplied an outdoor camping stove, by way of example, such that leg support can be supported and attached by such means to the stove, to thereby support the adjustable legs of the auxiliary grill of the present invention.

The features of the present invention, which are believed to be novel, are set forth with particularity in the appended claims. The present invention, both as to its organization and manner of operation, together with further objects and advantages thereof, may best be understood by reference to the following description, taken in connection with the accompanying drawings, in which:

in FIG. 4B there is illustrated the concept of fastening or simply resting magnetic means onto the clip, wherein the magnet itself precludes a magnetically permeable washer or equivalent device of the leg from rotation even though the leg itself is rotated.

Figure 1:
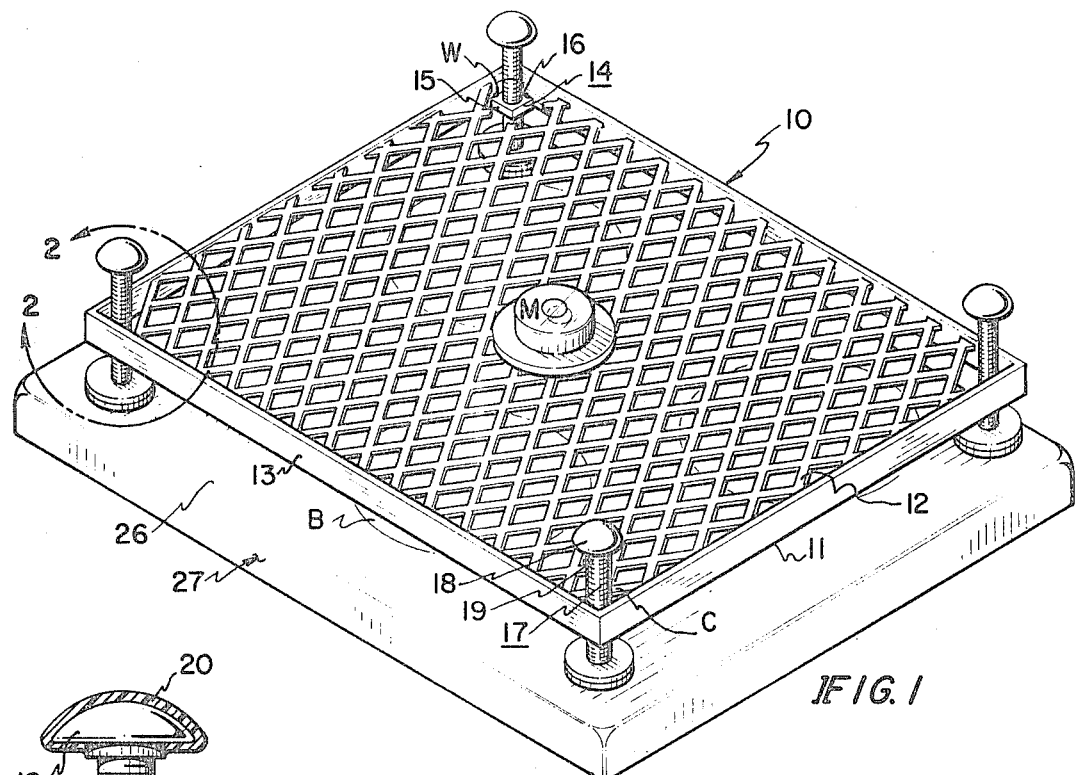
FIG. 1 is a perspective view of a grill incorporating the features of the present invention in one embodiment thereof.

In FIG. 1 the grill of the present invention, in a preferred embodiment thereof, is shown to comprise a heat-transmitting support member 10. The same may either be an iron or other heat-conductive plate, or simply a mesh-type grill 11 comprising a grill member 12 surrounded by and welded to frame 13. Where the support member 10 is so constituted, then frame 13 may include at its respective corners a threaded aperture structure 14 taking the form of nut 15 provided with respective threaded aperture 16. Welds W will secure the nut in place at each respective corner of the grill. The grill will be open at its corner area C to allow for the passage therethrough of respective legs 17. Thus, in a preferred embodiment of the invention the legs, when extensible, are threaded into and through apertures 16 and depend downwardly as threaded members. The legs may simply comprise bolts having bolt heads 18 and threaded shanks 19.

Figures 2A, 2B:
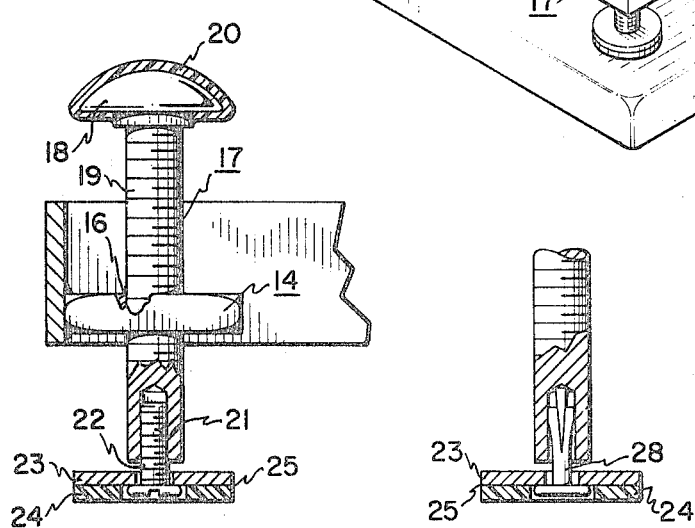
FIG. 2A is an enlarged, front elevation detail, principally in section, of a representative corner area of the grill in FIG. 1.
FIG. 2B is a fragmentary view of an alternate leg usable in the subject grill structure, is similar to FIG. 1, but illustrates the incorporation of an expansion rivet for securing the magnetic means to the leg in lieu of the screw of FIG. 2A.

In FIG. 2A is shown the structural cooperation of a representative leg 17 used in the invention. Preferably, the same will include a plastic head 20 which may circumscribe the bolt head 18. Plastic head 20 may simply be a substance such as Teflon provided the bolt-heads through dipping, or any other process, and will be heat-resistant so as to enable the easy manipulation of the bolt heads by a user.

Where the legs essentially comprise bolts, by way of example, the bolt shanks may be drilled and tapped at 21 to receive a respective screw 22. The same is employed to secure mounting element 23 thereto in a rotatable construction. Magnet 24 comprises magnetic means which is cemented as by an epoxy at 25 to element 23. Preferably, element 23 simply comprises the non-ferrous material either diamagnetic or paramagnetic as in the case of aluminum. The purpose for the preferred inclusion of member 23, composed of, say an aluminum washer, is to retain the full strength of the magnet at 24 for magnetic attachment to external structure such as the top 26 of stove 27 in FIG. 1.

As an alternative construction to the use of screw 22 as seen in FIG. 2A, the manufacturer may simply employ an expanded rivet 28 as an attachment means shown in FIG. 2B.

Figure 3:
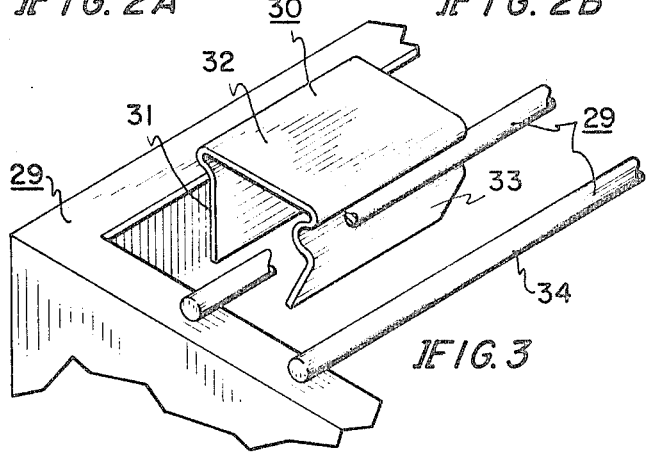
FIG. 3 is a perspective view, illustrating the manner in which a representative one of our mounts or clips can be secured to an outdoor camping stove to support representative legs of the grill structure in FIG. 1.

FIG. 3 illustrates a stove grill 29 as supporting a representative clip 30. The same may be provided with a flat side at 31, a top 32, and a curved inner side 33 for engaging representative grill rod 34. The clips 30 are made from the ferrous or other magnetically permeable material so that the magnets 24 of the individual legs of the grill can be magnetically attached thereto.

By way of reference to magnets 24, the same may comprise fabricated permanent magnets or, preferably, magnetic washers stamped from currently marketed magnet tape.

Figure 4A:
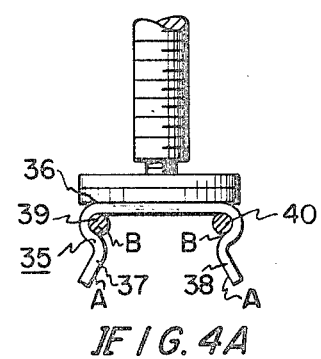
FIG. 4A is a front elevation of an alternate clip that can be used, clamped to adjacent rods of a stove, which clip is constructed to support a respective leg of the grill in FIG. 1.
Figure 4B:
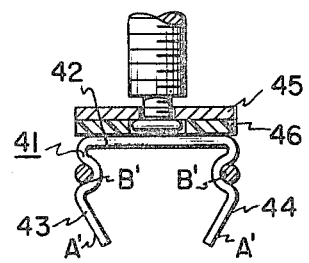
FIG. 4B is similar to FIG. 4A but illustrates a third type of clip usable in the context of FIG. 4A.

Another type of clip which may be used at each of the four corners of grill 29 is clip 35, the same having top 36 and arcuate curved sides 37 and 38 to receive grill rods 39 and 40 of grill 29. FIG. 4A illustrates the construction wherein the clips 35 are to be pushed over adjacent grill rods 40 so as to be snapped in place in the condition indicated.

Where the clips are to be disposed inwardly of adjacent or approximate grill rods, then the clip construction 41 of FIG. 4B may apply. This includes, again, a magnetically permeable top 42 and arcuate, inwardly formed sides 43 and 44. Each of the clips shown in FIGS. 4A and 4B, by way of example, have cam surfaces A and A' and arcuate retention surfaces B and B' for retaining the clips in position. Again, the grill legs simply rest upon the clips and the magnetic undersurface of magnets 24 will releasably engage such clips. In FIG. 4 it will be seen that rather than the magnet being secured to a representative washer of the grill, the washer or support element 45 may this time be a ferrous or other magnetically permeable material, with the magnet 46 this time being cemented or simply placed upon the representative clip 41.

Thus, the clips themselves may either be supplied the magnets, or the lower extremities of the legs of the grill. It is preferred, however, that the magnets 24 in FIG. 2A be supplied and attached permanently to the legs of the grill so that such legs are readily attachable to magnetically permeable means, such as a stove top as in FIG. 1, and to install support clips as in FIG. 2B and 4A to camping stoves when appropriate.

In operation and use, let is be assumed that the user has a camper or trailer and is coming into a camping area for the night. It will be the exception rather than the rule for the road to be completely flat, so as to insure that the top of his stove will be perfectly flat or horizontal. In the general case the camper and its stove will be non-horizontal, in which event the user will dispose the grill 11 over the burners B of the stove so that the magnet extremities of the grill legs will adhere to the stove top; through use of spirit level M that can be simply placed on the grill, the user will rotate the legs 17 until a horizontal position relative to the grill is obtained. Note is to be made that additional manipulations or height adjustments of the individual legs is easily possible even after the stove burners have been turned on, this by virtue of the heat-resistant caps 20 disposed over the individual bolt heads 18 comprising the legs. As to cooking use, pots and pans or even steak or fish products can be disposed directly upon the grill member 13 of the grill over burners B.

It is noted that the grill is suited not only for use relative to stoves disposing campers or trailers, but even can be employed in case of leveling the grill relative to flat ground or other ground contours or even rocks. Likewise, small outdoor camping stoves can be accommodated as, for example, by the clips provided as shown in FIGS. 2B, 4A and 4B. Of course, if the outdoor camping stove is not too deep, the legs may be so designed to thrust downwardly through the grate of grill of the stove so as to contact the bottom thereof.

What is provided hence is a new and improved heat-transmitting support member usable for cooking purposes, which member or grill is provided with adjustable legs, for leveling purposes, and also magnetic means, the latter securing the grill to an over, magnetically permeable structure such that the grill does not creep when the legs thereof are height-adjusted for leveling purposes, or when the grill is otherwise in use.

While particular embodiments of the present invention have been shown and described, it will be obvious to those skilled in the art that changes and modifications may be made without departing from this invention in its broader aspects.

I claim:

1. A grill including, in combination, a heat-transmitting support member; plural, mutually-spaced, support legs extensibly connected to said support member for supporting said support member in horizontal disposition above possibly non-horizontal external supporting means; and plural, magnetic means disposed underneath and engaging said legs for magnetically securing legs to said supporting means and wherein each of said legs includes a lower, rotatable support element, each of said magnetic means comprising magnets respectively affixed to an underside of respective ones of said support elements.

2. Structure according to claim 1 wherein said support member includes structure providing plural, transverse, mutually spaced threaded apertures, said legs comprising threaded members respectively threaded through said apertures.

3. Structure according to claim 2 wherein said threaded members comprise bolts provided with heads disposed above said support member, said bolts being provided with heat-resistant means for facilitating manual turning of said bolts at said heads.

4. Structure according to claim 1 wherein, when said supporting means comprises a grill-top stove, said grill includes plural clip means constructed for mutually-spaced attachment to said stove, said magnetic means comprising magnets respectively resting upon said clip means and affixed against rotatable movement with respect thereto despite possible adjustable movement of said legs.

5. A grill including, in combination, an essentially planar grill member, said grill member being provided with structure having plural, mutually spaced, transverse threaded apertures, plural threaded legs threadedly engaging said threaded apertures and extending therebeneath a selectable distance, depending upon surface character of an external support chosen for supporting said grill, and magnetic means rotatably secured to said legs proximate the lowermost ends thereof, for magnetically securing said legs and, hence, said grill to said external support.

* * * * *